(12) United States Patent
VanAntwerp et al.

(10) Patent No.: US 12,149,602 B2
(45) Date of Patent: Nov. 19, 2024

(54) METHOD AND SYSTEM FOR OPTIMIZING DYNAMIC USER EXPERIENCE APPLICATIONS

(71) Applicant: State Farm Mutual Automobile Insurance Company, Bloomington, IL (US)

(72) Inventors: John M. VanAntwerp, Normal, IL (US); Dan Kalmes, Bloomington, IL (US); Victoria Ann Spaulding-Burford, Marietta, GA (US); Thomas Schaefer, Hapeville, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/094,882

(22) Filed: Jan. 9, 2023

(65) Prior Publication Data

US 2023/0141866 A1    May 11, 2023

Related U.S. Application Data

(63) Continuation of application No. 16/001,602, filed on Jun. 6, 2018, now Pat. No. 11,550,565.

(Continued)

(51) Int. Cl.
*H04L 69/08* (2022.01)
*G06F 8/20* (2018.01)
(Continued)

(52) U.S. Cl.
CPC ............... *H04L 69/08* (2013.01); *G06F 8/20* (2013.01); *G06F 8/60* (2013.01); *G06F 8/70* (2013.01);
(Continued)

(58) Field of Classification Search
CPC .......... G06F 8/70; G06F 8/60; G06F 11/3604; G06F 11/3438; G06F 11/3419;
(Continued)

(56) References Cited

U.S. PATENT DOCUMENTS 6,314,415 B1   11/2001   Mukherjee
7,752,092 B1    7/2010   Mattice et al.
(Continued)

OTHER PUBLICATIONS

Machulak, et al., "User-Managed Access to Web Resources", retrieved Aug. 1, 2023, at «https://dl.acm.org/doi/pdf/10.1145/1866855.1866855», 2010, pp. 35-44.
(Continued)

*Primary Examiner* — S. Sough
*Assistant Examiner* — Cheneca Smith
(74) *Attorney, Agent, or Firm* — Lee & Hayes, P.C.

(57) ABSTRACT

Systems and methods may be provided for generating and modifying dynamic user experience (UX) applications that may be agile, personalized, quickly delivered, and capable of being seamlessly integrated across an organization. The behavior and functionality of the applications (e.g., user interfaces therein) may be tailored specifically to individual users in response to learned user preferences or tendencies, for example. Consequently, these dynamic UX applications may be rapidly deployed and capable of providing a satisfactory yet pliable user experience across applications.

20 Claims, 8 Drawing Sheets

Related U.S. Application Data

(60) Provisional application No. 62/535,613, filed on Jul. 21, 2017.

(51) Int. Cl.

| | |
|---|---|
| *G06F 8/60* | (2018.01) |
| *G06F 8/70* | (2018.01) |
| *G06F 11/36* | (2006.01) |
| *G06Q 10/067* | (2023.01) |
| *H04L 67/56* | (2022.01) |
| *G06F 3/04817* | (2022.01) |
| *G06F 3/0484* | (2022.01) |
| *G06F 8/10* | (2018.01) |
| *G06F 8/38* | (2018.01) |
| *G06F 9/50* | (2006.01) |
| *G06Q 10/0633* | (2023.01) |
| *G06Q 40/12* | (2023.01) |
| *H04L 67/306* | (2022.01) |
| *H04L 67/50* | (2022.01) |

(52) U.S. Cl.
CPC ....... *G06F 11/3604* (2013.01); *G06Q 10/067* (2013.01); *H04L 67/56* (2022.05); *G06F 3/04817* (2013.01); *G06F 3/0484* (2013.01); *G06F 8/10* (2013.01); *G06F 8/38* (2013.01); *G06F 9/5038* (2013.01); *G06Q 10/0633* (2013.01); *G06Q 40/123* (2013.12); *H04L 67/306* (2013.01); *H04L 67/535* (2022.05)

(58) Field of Classification Search
CPC .... G06F 3/167; G06F 2201/86; G06F 3/0481; G06F 11/3409; G06Q 30/0269; G06Q 30/0244; G06Q 10/0639; G06Q 30/0267
See application file for complete search history.

(56) References Cited

U.S. PATENT DOCUMENTS

| | | |
|---|---|---|
| 7,818,341 B2 | 10/2010 | Kurien et al. |
| 8,533,584 B2 | 9/2013 | Dittmar et al. |
| 9,086,914 B2 | 7/2015 | Bolohan et al. |
| 11,069,001 B1 | 7/2021 | Mascaro et al. |
| 2002/0161911 A1 | 10/2002 | Pinckney, III et al. |
| 2004/0015578 A1 | 1/2004 | Karakashian et al. |
| 2004/0163037 A1 | 8/2004 | Friedman et al. |
| 2006/0005140 A1 | 1/2006 | Crew et al. |
| 2006/0069605 A1 | 3/2006 | Hatoun |
| 2006/0074735 A1 | 4/2006 | Shukla et al. |
| 2006/0161272 A1 | 7/2006 | Haller et al. |
| 2007/0271521 A1 | 11/2007 | Harriger et al. |
| 2008/0077530 A1 | 3/2008 | Banas et al. |
| 2008/0154935 A1 | 6/2008 | Draeger et al. |
| 2011/0004590 A1 | 1/2011 | Lilley et al. |
| 2011/0282941 A1 | 11/2011 | Chan et al. |
| 2012/0303756 A1 | 11/2012 | Bolohan et al. |
| 2013/0036367 A1 | 2/2013 | DeRoos et al. |
| 2013/0152001 A1 | 6/2013 | Lovitt et al. |
| 2013/0152041 A1* | 6/2013 | Hatfield ............... G06Q 10/06 717/105 |
| 2013/0158964 A1 | 6/2013 | Hall et al. |
| 2013/0159228 A1 | 6/2013 | Meijer et al. |
| 2013/0173719 A1 | 7/2013 | Ahmed et al. |
| 2014/0047028 A1 | 2/2014 | Buth |
| 2014/0122497 A1 | 5/2014 | Eigner et al. |
| 2014/0229898 A1 | 8/2014 | Terwedo |
| 2015/0074615 A1 | 3/2015 | Han et al. |
| 2016/0147729 A1 | 5/2016 | Sivertson et al. |
| 2016/0147828 A1 | 5/2016 | Yu et al. |
| 2016/0259534 A1 | 9/2016 | Simons et al. |
| 2016/0275627 A1 | 9/2016 | Wang et al. |
| 2016/0283889 A1 | 9/2016 | Shukla et al. |
| 2017/0132200 A1 | 5/2017 | Noland et al. |
| 2017/0161855 A1 | 6/2017 | Schreyer |
| 2017/0220963 A1 | 8/2017 | Canaran et al. |
| 2017/0264566 A1 | 9/2017 | Namboodiri et al. |
| 2017/0315782 A1 | 11/2017 | Chaudhry et al. |
| 2017/0315789 A1 | 11/2017 | Lam et al. |
| 2017/0316363 A1 | 11/2017 | Siciliano et al. |
| 2017/0322782 A1 | 11/2017 | Pakiman et al. |
| 2017/0344895 A1* | 11/2017 | Roy ...................... G06F 3/0484 |
| 2017/0357627 A1 | 12/2017 | Peterson et al. |
| 2018/0108093 A1 | 4/2018 | Podgorny et al. |
| 2018/0124205 A1* | 5/2018 | Nitsan .................... H04L 67/62 |
| 2018/0210619 A1 | 7/2018 | Mowatt et al. |
| 2018/0321830 A1 | 11/2018 | Calhoun |
| 2018/0365025 A1* | 12/2018 | Almecija ................ G06N 5/04 |
| 2019/0355351 A1 | 11/2019 | Kim et al. |
| 2022/0286531 A1 | 9/2022 | VanAntwerp et al. |
| 2023/0208943 A1 | 6/2023 | VanAntwerp |

OTHER PUBLICATIONS

Office Action for U.S. Appl. No. 16/001,629, mailed on Aug. 4, 2023, John M. VanAntwerp, "Method and System for Reconciling User Interactions", 13 pages.

Office Action for U.S. Appl. No. 16/001,571, mailed on Aug. 2, 2023, VanAntwerp, "Method and System for Administering Dynamic User Experience Applications", 15 pages.

Herbst, et al., "Integrating Machine Learning and Workflow Management to Support Acquisition and Adaption of Workflow Models", retrieved Dec. 2021, at «https://onlinelibrary.wiley.com/doi/pdf», 2000, pp. 67-92.

Office Action for U.S. Appl. No. 16/001,629, mailed on Jul. 9, 2021, VanAntwerp, "Method and System for Reconciling User Interactions", 14 pages.

Final Office Action dated Jul. 23, 2020 for U.S. Appl. No. 16/001,629, "Method and System for Reconciling User Interactions", VanAntwerp, 9 pages.

Final Office Action dated Aug. 6, 2020 for U.S. Appl. No. 16/001,571, "Method and System for Administering Dynamic User Experience Applications", VanAntwerp, 20 pages.

Office Action for U.S. Appl. No. 16/001,602, mailed on Sep. 2, 2021, VanAntwerp, "Method and System for Optimizing Dynamic User Experience Applications", 25 pages.

Non Final Office Action dated Jan. 24, 2020 for U.S. Appl. No. 16/001,571 " Method and System for Administering Dynamic User Experience Applications" VanAntwerp, 9 pages.

Office Action dated Jan. 7, 2021 for U.S. Appl. No. 16/001,629, "Method and System for Reconciling User Interactions", VanAntwerp, 9 pages.

Office Action for U.S. Appl. No. 16/001,571, mailed on Dec. 21, 2021, VanAntwerp, "Method and System for Administering Dynamic User Experience Applications", 12 pages.

Office Action for U.S. Appl. No. 16/001,629, mailed Dec. 21, 2021, VanAntwerp, "Method and System for Reconciling User Interactions" 14 pages.

Office Action dated Feb. 22, 2021 for U.S. Appl. No. 16/001,571, "Method and System for Administering Dynamic User Experience Applications", VanAntwerp, 11 pages.

Office Action dated Mar. 2, 2021 for U.S. Appl. No. 16/001,602 "Method and System for Optimizing Dynamic User Experience Applications" VanAntwerp, 20 pages.

Final Office Action dated Mar. 4, 2020 for U.S. Appl. No. 16/001,602 "Method and System for Optimizing Dynamic User Experience Applications" VanAntwerp, 19 pages.

Office action for U.S. Appl. No. 16/001,629, mailed on Apr. 3, 2020, VanAntwerp, "Method and System for Reconciling User Interactions", 8 pages.

Non Final Office Action dated May 29, 2020 for U.S. Appl. No. 16/001,643 "Method and System of Generating Generic Protocol Handlers" VanAntwerp, 12 pages.

Office Action for U.S. Appl. No. 17/222,221, mailed on Jun. 30, 2022, VanAntwerp, "Method and System of Generating Generic Protocol Handlers", 6 pages.

(56) References Cited

OTHER PUBLICATIONS

Office Action for U.S. Appl. No. 16/001,571, mailed on Jul. 21, 2022, VanAntwerp, "Method and System for Administering Dynamic User Experience Applications", 13 pages.

Office Action for U.S. Appl. No. 16/001,629, mailed on Jul. 21, 2022, VanAntwerp, "Method and System for Reconciling User Interactions", 14 pages.

Office Action for U.S. Appl. No. 16/001,571, mailed Aug. 31, 2021, Kalmes, "Method and System for Administering Dynamic User Experience Applications", 11 pages.

Schaffer, "Common SMS Problems and How to Solve Them, Part 1", Twilio Cloud Blog, available at «https://www.wilio.com/blog/2015/08/common-sms-problems-and-how-to-solve-them-part-1.html», Aug. 21, 2015, 7 pages.

Office Action for U.S. Appl. No. 17/750,554, mailed on Apr. 25, 2023, VanAntwerp, "Method and System for Generating Dynamic User Experience Applications", 21 pages.

Office Action for U.S. Appl. No. 16/001,571, mailed on Dec. 8, 2023, John M. VanAntwerp, "Method and System for Administering Dynamic User Experience Applications", 14 pages.

Office Action for U.S. Appl. No. 16/001,629, mailed on Dec. 8, 2023, John M. VanAntwerp, "Method and System for Reconciling User Interactions", 15 pages.

* cited by examiner

METHOD AND SYSTEM FOR OPTIMIZING DYNAMIC USER EXPERIENCE APPLICATIONS

CROSS REFERENCE TO RELATED APPLICATIONS

This application is a continuation of U.S. application Ser. No. 16/001,602, filed Jun. 6, 2018, which claims the benefit of U.S. Provisional Application 62/535,613, filed Jul. 21, 2017, and entitled "Method and System for Generating Dynamic User Experience Applications." The entire contents of the above applications are incorporated herein by reference.

FIELD OF THE DISCLOSURE

The present disclosure generally relates to application engines for building computer-implemented applications, and more specifically, to techniques for optimizing dynamic user experiences within applications.

BACKGROUND

Typically, an organization may offer a number of computer implemented applications (e.g., web applications, mobile applications, and/or desktop software applications) via which users (e.g., the organization's customers, clients, and/or employees) may interact with the organization and its offered services and/or products. For example, the organization may be a financial services entity, and may offer an application via which a user may apply for a credit card, mortgage, or another financial product. Generally, such an application may include one or more user interfaces (UI) deliverable to a client device (e.g., smartphone, desktop, or laptop computer) via which the user may, for example, provide personal information relevant to acquiring the product or service.

With regard to applications, is it important for the organization to provide a satisfactory and consistent user experience (UX) for the users within one application, and/or across multiple applications offered by the organization. In this context, "user experience" may generally refer to the systems and methods via which one or more users may interact with an application, and the UX may include one or more user interfaces (UI, e.g., web form, audio interface, SMS interface, etc.) via which the application may present information to users and/or receive user input to engage with a product or service.

Methods and systems of generating and delivering applications (and consequently, the applications themselves) may be affected by a number of challenges that may negatively affect UX for users of one or more applications offered by the organization. In particular, an application user base (i.e., the collective users accessing one or more applications) may be diverse in their UX preferences—in other words, different user experiences may suit some users better than other users. For example, while some users may feel comfortable and proficient entering providing personal information via a web form, other users may find more comfort (e.g., security) and/or proficiency in providing the same information vocally via an audio prompt (e.g., a voice call to a cellular phone). Reduced user satisfaction with a UX may negatively impact the size and reach of the user base interacting with one or more applications.

Conventionally, an organization offering one or more applications may be unable to quickly and effectively modify significant aspects of a UX (e.g., beyond simple cosmetic variations such as color schemes, etc.) within an application. Moreover, any modification implemented to an application UX may be monolithic, in that the UX modification is delivered to all users, which may negatively impact users who were satisfied with the UX prior to the modification. Furthermore, even if a UX modification to one application may be satisfactory to a user base, it may be time consuming and costly to implement same or similar UX modifications to other applications offered by the organization. Consequently, it may be difficult to maintain consistent UX, application programming interfaces (APIs)s, data schemas, and general "look-and-feel" across multiple applications offered by the organization, while at the same time delivering satisfactory and effective experiences to diverse users of the applications.

BRIEF SUMMARY

The present embodiments may generally relate to techniques for generating and modifying dynamic user experience (UX) applications, the techniques allowing an organization to personalize user experiences to individual users, as well as easily propagate changes to applications across multiple applications potentially offered by the organization.

An application may be associated with an application execution workflow or "path" (e.g., a process of applying for a credit card) requiring interaction between a system hosting the application and a client device accessing the application to acquire a product or service. The workflow may correspond to a plurality of discrete "steps" (e.g., a step of providing/obtaining a particular element of information, a step for verifying information, a step for acknowledging a privacy notice, and/or other steps). For each step, a plurality of application components (e.g., user interface elements such as a web form or SMS message) may be generated, wherein each component may be equally (and individually) capable of enabling completion of the step. To complete a step, an application may provide a particular component to a client device of a user, and the application may monitor client interaction with the component to determine efficacy of the application (e.g., efficacy of the particular component, step, or workflow), by analyzing the user's comfort and/or proficiency in engaging with the component, the user's ability to provide a valid response to a prompt (e.g., request for information) included in the component, and/or other implicit or explicit feedback provided via the user or the client device.

Based upon the feedback, various modifications may be automatically or manually made to applications, including but not limited to (i) the particular component, (ii) another application component, (iii) the step associated with the component, (iv) an arrangement of steps (e.g., order of steps, addition of a step, subtraction of a step, or dependency between steps) in the workflow (or another application), and/or (iv) an "application delivery profile" associated with a user.

The systems and methods described herein may enable an organization to modify (or "optimize") user experiences quickly within dynamic (UX) applications, and further to customize UX modifications to each individual user interacting with the one or more dynamic UX applications based upon learned user preferences and/or tendencies, hence improving user satisfaction and engagement with the one or more dynamic UX applications offered by the organization.

In one embodiment computer-implemented method may be provided for determining an efficacy of a dynamic user experience application operating at a client device. The method may include (1) identifying, via a remote computing system, a plurality of application components deliverable within the application, wherein each of the plurality of application components is associated with execution of a same step in an active execution path of the application, (2) identifying, at the remote computing system, from the plurality of application components, a particular component to execute at the client device to perform the step, based upon an application delivery profile associated with the client device or a user of the client device, (3) providing, via the remote computing system, the particular component to the client device, (4) detecting, via the remote computing system, an interaction with the provided component via the client device, and/or (5) determining, at the remote computing system, an efficacy of the application, based at least in part upon the detected interaction. The method may include additional, fewer, or alternate actions, including those described herein.

In another embodiment, a computing system may be provided, the computing system configured to determine an efficacy of a dynamic user experience application operating at a client device. The computing system may include (1) one or more processors, and (2) one or more memories storing computer-executable instructions that, when executed by the one or more processors, cause the computing system to: (i) identify a plurality of application components deliverable within the application, wherein each of the plurality of application components is associated with execution of a same step in an active execution path of the application; (ii) identify; from the plurality of application components, a particular component to execute at the client device to perform the step, based upon an application delivery profile associated with the client device or a user of the client device; (iii) provide the particular component to the client device; (iv) detect an interaction with the provided component via the client device; and/or (v) determine an efficacy of the application, based at least in part upon the detected interaction. The system may include additional, fewer, or alternate components, or may be configured to perform other actions, including those described herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 3A-3C depict user interface components that may be associated with a particular step, in accordance with some embodiments;

DETAILED DESCRIPTION

I. Overview

Figure 1:
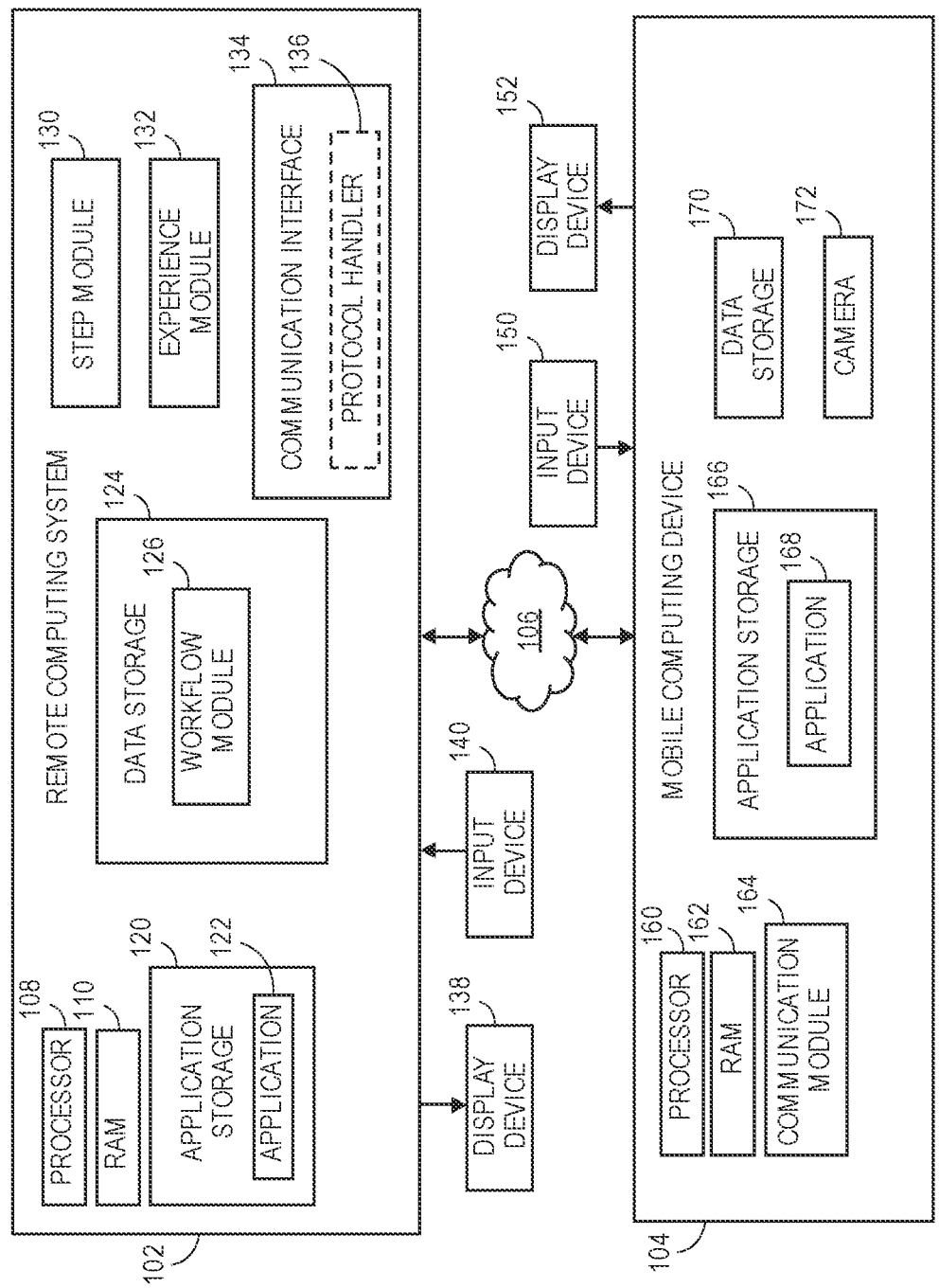
FIG. 1 depicts an example environment for generating and modifying dynamic UX applications, in accordance with some embodiments.

The embodiments described herein relate to, inter alia, generating and modifying ("optimizing") computer-implemented "dynamic user experience (UX) applications" are agile, personalized, quickly delivered to users, and capable of being seamlessly integrated across an organization (e.g., a large business entity). Techniques may be used to generate a dynamic UX application to carry out a business process organized into a workflow (or "path," which may be used interchangeably herein) comprising a series of steps. Further, techniques may be used to dynamically modify the behavior and functionality of an application, including while the application is installed or running in a client computing device, without requiring redeployment of the application to the client users. The dynamic UX applications according to techniques described herein may exhibit behavior and functionality (e.g., user interfaces) that are specific to the user of the application, may be rapidly deployed using conventional or proprietary deployment techniques, and may be capable of communicating and exchanging data in a common "canonical" format with other applications deployed across an organization, despite potential variance in business objectives of those applications.

A workflow may refer to a portion of a business process that requires interaction via a user (e.g., collection of data, approval or verification of information presented to the user, etc.). For example, an application may be provided for applying for a credit card, with the credit card application corresponding to a workflow (i.e., one or more workflows) that includes one or more steps. An application workflow may, for instance, include a step for collecting one or more elements of personal information (e.g., home address, date of birth, etc.) from the user. Accordingly, steps may be associated with one or more parameters (e.g., "homeAddress" or "birthDate"), each of which may be associated with a canonical data type that allows for consistency across steps, workflows, and applications. Via the techniques described herein, workflows may be reused across applications, and steps may be reused across workflows and applications. For example, the same organization offering the credit card application may additionally offer an auto insurance application, which may similarly require personal information, such as name and home address, from a user of the application, and thus workflows of each application may share one or more steps.

A client application may be provided to the client computing device ("client device," e.g., laptop, desktop, server, smartphone, wearable device, etc.) of a user, allowing the client device to construct a dynamic UX application, for example by accessing a remote computing device (e.g., one or more servers), by transmitting messages to and/or receiving messages from the remote computing device.

The remote computing device may include a path management application or workflow manager application configured to create, store, modify, and/or deliver workflows (or "paths," which may be used interchangeably herein), steps comprising the workflows, and/or other rules defining how paths and steps are displayed at the client device. Workflows and steps may be arranged hierarchically, wherein steps may include sub steps or workflows may include sub-flows, for instance. Steps may be associated with "dependencies" defining other steps prerequisite to performing the step. A dependency associated with a step may be defined particular to a workflow (e.g., workflow X requires completion of step Y before execution of step Z) or may be general to the step itself (e.g., business practice, jurisdictional law, and/or logical reasoning requires a completion of a step Y before step Z). Additionally or alternatively, a step or workflow may be associated with other metadata (e.g., indicating steps that may be "optional" within one or more workflows). Furthermore, the path management application may create and/or modify "canonical" resources and/or data types that are capable of being commonly used across applications, allowing for consistent development and maintenance of APIs across separate applications offered by the organization for separate business objectives.

Each step may be associated with a plurality of user interface components ("components"), wherein each component may be equally and independently deliverable a client device of the user to enable completion of the step. For example, a step for acquiring the user's home address may associated with (i) a first component in the form of a web page/form deliverable to the client device, via which the user may provide the user's home address via text input; (ii) a second component in the form of an SMS text deliverable to a smartphone of the user to request (and receive via SMS reply) the user's home address; and (iii) a third component associated with a voice input (e.g., prompted via a web page, or requested in a voice call to the user's phone), via which the user may utilize a microphone in the client device to provide the user's home address.

Upon execution of a workflow, the workflow manager may manage state information associated with the workflow, including a "current step pointer" that may track the step within the workflow that the user is in the process of completing. State of an executing workflow may be associated in "interaction" records associated with workflows and users. In some embodiments, a user may be associated with a list of step progresses, wherein each step progress corresponds to the user's progress in the respective step. In execution of a step, an experience manager at the remote computing device may communicate with the workflow manager to identify a current step and determine, from components associated with the current step, which component to deliver to the client device. The determination of the component may be based upon learned information associated with the user (e.g., stored via a user profile at the remote computing device), other application users, the component(s), the current step, and/or the active workflow associated with the active dynamic UX application. Techniques for determining a particular component from multiple components associated with a step will be discussed further herein.

After delivering a particular component to a client device, a dynamic UX application may further monitor the client device's and/or user's interaction with the component. By monitoring interaction, the application may determine "efficacy" of the dynamic UX application, based upon, for example, (i) whether the component executes properly (e.g., compatibly with a client device's operating system, and without technical error) on the client device to which the component was delivered, (ii) whether the user was satisfied with component, or (iii) whether delivery of the component caused the user to provide the necessary input to complete the step, and/or (iv) some other interaction or lack thereof, as described herein. Indications of efficacy of a component may be acquired explicitly (e.g., an in-application or another survey explicitly asking for user feedback) or implicitly (e.g., by observing whether the user continues within the workflow, how long the user takes to interact with the component, etc.). Efficacy of the application may refer to efficacy of the application as a whole, or more specifically to the active workflow, step, and/or component.

Determinations of efficacy of applications may be utilized to automatically and/or manually implement modifications to workflows, steps, components, and/or delivery patterns associated with particular users. As just one example, a particularly sensitive step within a credit card application workflow may require acquisition of a user's social security number (SSN), and a particular delivered component may request the user's SSN via an SMS message. Some users, however, may exhibit reluctance to providing such sensitive information via SMS (e.g., due to lack of familiarity, or because a sent SMS may be easily readable among the user's sent SMS messages unless the user manually deletes the SMS message). The application may determine the lack of efficacy of the particular component, and in response, one or more modifications may automatically or manually be initiated. An appropriate modification may, for example, include (i) updating a user profile associated with delivery of dynamic UX applications to the user; (ii) a modification of the order of steps in the application workflow to move the SSN step to a later point in the workflow (when the user may be more comfortable providing sensitive information); (iii) or a modification of the SSN step itself, such that the SSN step may execute with delivery of a different component (e.g., a web page or an audio prompt via voice call) to future users of the application or other applications comprising the SSN step. Various other modifications are possible, and will be discussed herein.

Via the systems and methods herein, modifications to applications and the elements thereof may be easily and quickly portable to a multiplicity of users and applications. For example, a modification to the order of steps in an application may be easily ported to all users of the application. Further, a modification of a user's application delivery profile may cause all applications offered by the organization to deliver components more suitable to the user. Furthermore, a modification to a step may propagate the modification to other applications that utilize the same step. Thus, dynamic UX applications described herein may provide satisfactory, effective, and individualized user experiences for various user of the application.

Example Environment for Implementing Dynamic Ux Applications

FIG. 1 depicts an example environment 100 in which dynamic user experience (UX) applications may generated, delivered, and optimized, according to some embodiments. The environment 100 includes various server-side components and client-side (i.e., user-side) components. Generally environment 100 may include a remote computing system 102 (comprising one or more servers, for instance) that may be communicatively coupled to one or more mobile computing devices 104 (also referred to herein as "client device," e.g., laptop computer, smartphone, tablet, or other non-mobile computing devices such as a desktop computer or landline telephone) associated with (e.g., owned/operated by) one or more application users. The remote computing system 102 and client device 104 may be communicatively coupled via a network (i.e., one or more networks 106). The network 106 may include multiple communication networks of one or more types (e.g., one or more wired and/or wireless local area networks (LANs), wide area networks (WANs)

such as the Internet, cellular communications networks, etc.). The precise arrangement of the components described herein may differ from that depicted in FIG. 1, in some embodiments.

The remote computing system 102 may be deployed as a single server device or multiple server devices, and accordingly may be referred to herein as "server device 102," or more simply "server 102." In embodiments comprising multiple server devices, each server may be representative of a particular business API or service, and the multiple servers may provide benefits including isolation of business APIs, isolation of production and testing environments, and stability. Additionally or alternatively, the remote computing system may include a server housing multiple business APIs in a platform-as-a-service (PaaS) model, which may provide benefits including seamless sharing of resources between business APIs, as well faster implementation/propagation of changes to APIs and shared resources.

The client computing device ("client device," i.e., one or more devices) 104 may be any suitable device or combination of devices (e.g., desktop computer, laptop computer, smartphone, notebook, tablet, etc.) running any suitable operating system for performing the functions of the client device 104 described herein.

The server device 102 may include a processor (i.e., one or more processors), an RAM (i.e., one or more RAM) 110, and an application/program storage (e.g., one or more persistent (non-transitory) memories) 120 including one or more applications 122, which may include software instructions (e.g., a web stack, Android package, etc.). The processor 108 may include any suitable number of processors of one or more suitable types (e.g., one or more central processing units (CPUs), graphics processing units (GPUs), etc.). Generally, the processor 108 may be configured to execute software instructions stored in one or more memories (e.g., stored in a persistent memory such as a hard drive or solid state memory) of server device 102. The RAM 110 may include solid state and/or transient memory and may store the application(s) 120, including instructions (e.g., corresponding to application(s) 122). When processor 108 executes instructions corresponding to the application 122, the RAM 110 may, for example, temporarily store the instructions and data required for execution of the application 122. The processor 108 may load instructions stored in the application storage 120 or any other location into the RAM 110. Software instructions, when executed by the processor 108, may generate, create, and/or execute one or more dynamic UX applications, which may be loaded into the RAM 110 and/or the application storage 120.

The server device 102 may also include a display device (i.e., one or more display devices) 138 and an input device (i.e., one or more input devices) 140. Input device(s) 140 may include components that are integral to the server device 102, and/or exterior components that are communicatively coupled to the server device 102, to enable the server device 102 to read/retrieve inputs from the user via the input device 140. For example, the input device 140 may include a mouse, a keyboard, a trackball device, a microphone, scanner, etc. The display device 138 may also be either integral or external to the server device 102, and may use any suitable display technology (e.g., LED, OLED, LCD, etc.). In some embodiments, the input device 140 and the display device 138 may be integrated, such as in a touchscreen visual display. Generally, the input device 140 and the display device 138 may combine to enable a user to interact with user interfaces provided by server 102, for example, to perform server-side generation, modification, and other management of applications, workflows, steps, components, and user profiles described herein.

Generally, the server device 102 may operate to generate and modify dynamic UX applications, and further to deliver the applications to the client device 104 and process user requests (or "queries") generated by the applications in response to user interaction with the applications. Portions of the dynamic UX applications (e.g., UX components) generated/delivered by the server device 102 may be displayed for interaction at the client device 104, for example via a client input device (i.e., one or more input devices) 150 and/or a client display device (i.e., one or more display devices) 152. The server device 102 may perform these functions via the application 122, which may, for example, provide code and data (e.g., a dynamic UX application) to the client device 104. Code and data may include a fully-formed dynamic UX application, or requests/queries used to construct, modify, and/or view a dynamic UX application or portions of a dynamic UX application displayed in the client device 104. For example, server device 102 may generate web pages (e.g., Hypertext Markup Language (HTML) instructions, JavaScript instructions, Java Server Pages (JSP) instructions, mobile device application, and/or any other type of instructions suitable for defining the content and presentation of the code and data), and/or may include instructions of a plug-in, extension, and/or stand-alone software component that may be downloaded by client device 104.

Generally, the server device 102 may provide users accessing the application 122 with one or more user interfaces which may enable the user to interact with the application 122, and which in turn, may modify data associated with the server device 102. To that end, the server device 102 may transmit to the client device 104 user interface (UI) components (e.g., style sheets, executable code, HTML or JavaScript widgets, etc.), which the client device 104 may execute, and with which the user of the client device 104 may interact. The client device 104 may transmit data back to the server device 102 in the form of requests/queries, which may include data payloads.

The server device 102 may additionally include data storage 124, a workflow module 126, a step module 130, and an experience module 132. Furthermore, the server device 102 may include a communication interface 134, which may include one or more protocol handlers 136 that enable cause information to be transmitted between the server device 102 and client device 104 by performing translation, formatting, and other processing on the information to be transmitted.

The data storage 124 may be composed of any suitable persistent or transient memory (e.g., a hard drive, random-access memory unit, etc.), and may store any number of modules including, without limitation, those depicted in FIG. 1. The data storage 124 may include an electronic database (e.g. a relational database, key-value store, flat file, etc.) in which electronic records representing paths and steps may be stored, and associated. For example, a path may be stored in a one-to-one, one-to-many, or many-to-many relationship with one or more steps. A step may be stored in a similar relationship with respect to one or more canonical types. A user may configure and modify the respective relationships between workflows, steps, and canonical types using the methods and systems described herein. Furthermore, the data storage 124 may include user profiles corresponding to individual application users and/or classes of users, and the server device 102 may utilize to profiles to identify particular components to deliver to users of the application 122.

The workflow module 126 may generally include workflow metadata and instructions for managing workflows. Workflow metadata may include, for example, names, creation dates/times, unique identifiers associated with workflows, and/or state information associated with active workflows. Accordingly, the workflow module 126 may be communicatively connected to a data store in which workflows and steps are stored. The workflow module 126 may receive requests/queries, in response to which application 122 may take actions and issue responses. For example, workflow module 126 may execute and advance a workflow associated with a user by advancing a current step pointer from one step to another, for example, if the workflow module 126 determines based on an analysis of the query that a step has been successfully completed. The workflow module 126 may communicate information (e.g., indicative of a current step in a workflow) to the experience module 132, from which the experience module may identify a component from components associated with the step. Similarly, the workflow module 126 may terminate a given workflow, add a step to a workflow, create a new workflow, associate one or more canonical types with a step, evaluate a step, etc. based on instruction from the application 122.

The step module 130 may include step metadata and instructions for executing steps. In some embodiments, the step module 130 may be integrated with the workflow module 126. Step metadata may include, for example, a list of workflows associated with respective steps, components associated with respective steps, and/or parameters and canonical types associated with inputs associated with respective steps. The step module may execute a series of steps sequentially for execution of a workflow. Generally, each step may include a response/request loop between the server device 102 and the client device 104 (e.g., the user of the client device 104 provides information, verifies information, or acknowledges information received from the server device 102). Execution of a step by the server device 102 may include monitoring and/or evaluating the user's interaction with the step (i.e., interaction with a provided component).

The experience module 132 may generate user experiences dynamically based upon learned information associated with users (e.g., determined efficacy of the executing application and/or another application with respect to users) and/or based upon other UX rules. Information may be learned, in some embodiments, based upon trained machine learning techniques, whereby the experience module 132 may be trained to identify components to deliver to users, based upon known training data including known components best suited for one or more "training users." In any case, dynamic execution of applications may include delivery of particular components to particular users based upon the rules/learned information. Effectively, the experience module 132 may create a user experience by converting instructions to execute steps into a particular manifestations of each step (i.e., components) best suited to the active user. The experience module 132 may be implemented using a suitable application framework (e.g., Ember.js).

To guide delivery of components at client devices 104, the experience module may send messages to the protocol handler 136 in a "canonical request format" independent of communication protocols used by the client device 104. The protocol handler 136 may, in turn, deliver the component to the client device according to the appropriate communication protocol. Conversely, the protocol handler 136 may convert data payloads received from the client device 104 into a canonical format to be routed to the workflow module 126 and/or experience module 132.

In some embodiments, the experience module 132 may modify a component for delivery to a user based upon indications of already known information regarding a user. For example, with regard to a step for collecting personal information from a user, the experience module 132 may identify (e.g., based upon communication with other components of the server device 102) that one particular element of personal information is already known (e.g., from previous user interaction). Based upon this identification, the experience module 132 may alter the step by adding pre-populated information, and displaying an indication (e.g., a textual message and/or reordering of information) to the user that such information only needs confirmation by the user.

In some embodiments, the experience module 132 may additionally communicate with the workflow module 126 to acquire workflow metadata, such as a number of steps remaining in a workflow, or an indication of one or more steps that are incomplete. Based upon such information, the experience module 132 may delay determination and/or delivery of a component to a client device 104.

The experience module 132 may access information (e.g., interaction records, or information derived therefrom regarding applications/components/steps/workflows) collected during research to modify steps and/or identify components for delivery. Information collected during research may include, for example, user survey data collected from users, user facial analysis data collected from the application user, data indicative of users' completion or lack of completion of steps/workflows, and/or other information regarding interaction with one or more applications via one or more users. Research information may indicate, for example, that users are more comfortable providing a social security number (or other highly sensitive information) via a format that does not persist on the user's device (e.g., via a web form or voice call, as opposed to an SMS message). Research information may be captured in workflow interaction records, or in the case of research indicative of a specific user's preferences (e.g., preferred or often-used devices, communication protocols, visual preferences, language, etc.), in a user profile corresponding to the user. In any case, upon receiving research information indicative of efficacy of components, steps, and/or workflows, the experience module 132 may be more likely to provide (e.g., apply a "weight" to) components that are more likely to cause users to complete the step. Furthermore, the experience manager 132 may modify visual properties (e.g., color schemes, font, text size, etc.) of a component based upon learned information associated with one or more users.

The protocol handler 136 may receive requests/queries from a client device 104. The protocol handler 136 may examine requests, determine if each request is associated with a user or session, and if so, whether the user/session corresponds to an existing user/session. Sessions may be stored in a database communicatively coupled to server 102, or client 104. The protocol handler 136 may determine a network protocol and sub-protocol associated with a request, and may route the request to the workflow module 126 or another module, which may cause workflow module 126 to begin executing a workflow at a position (e.g., at a step). The position may be specified by a request, or may be associated with a user/session. In general, requests may be received by the protocol handler 136 and responses may be sent by the protocol handler 136. As used herein, the term "request" generally refers to an electronic request object that represents an exchange of information between a user and an application via the network 106. The terms "user request" and "request" may be used interchangeably. Requests and responses may be transferred between the server device 102 the client device 104 via a common data interchange protocol (e.g. via a representational state transfer (REST) API) or a proprietary data interchange protocol. While some of the examples herein refer specifically to requests and responses pertaining to, for example, credit card and auto insurance applications, it should be appreciated that the techniques described herein are applicable to many other types of applications. For example, a gaming application created for a mobile device may support its own form of user requests and responses. Requests may, for example, include information entered by a user during the execution of a dynamic UX application by a user of a client device 104 via the input device 150. For example, a user may enter information into a form, and press a "submit" button, which may cause the information to be transmitted and/or processed.

In some embodiments, more than one protocol handler 136 may be configured, and protocol handler 136 may be integral to a client and/or server in the environment 100. Code executing in a client device 104 may cause user requests to be sent to the server device 102, and may receive responses, potentially unbeknownst to the user. Requests may be sent by the client device 104 synchronously or asynchronously with respect to the execution of code in the client device 104. As noted, in addition to translating requests between clients and applications, the protocol handler 136 may route requests to application 122 components, and may also provide other modules with information pertaining to the capabilities of client devices. If a request type corresponds to a workflow initiation or resumption, then the protocol handler 136 may route the request to workflow module 126. Upon receiving a request, the workflow module 126 may determine whether to resume an existing interaction or begin a new one based on the request contents. Workflow module 126 may determine whether an interaction already exists by analyzing an indication and/or metadata from client device 104 (e.g., a UUID and/or an HTTP header). If an existing interaction is to be used, the workflow module 126 may retrieve the existing interaction. If a new interaction is to be used, the workflow module 126 may initiate a new interaction. It should be noted that a user may also decide to cancel or terminate a workflow. Additionally or alternatively, a step may contain logic that causes a workflow to terminate if a certain condition is met, or if a particular input is provided to the step by a user (e.g., by a user of client 104). In some embodiments requests and responses may be respectively handled and issued by client device 104, either exclusively or in combination with the server device 102.

The client device 104 may include a processor (i.e., one or more processors) 160, a random access memory (RAM, i.e., one or more RAMs) 162, a communication module (i.e., one or more communication modules) 164, a program/application storage (i.e., one or more non-transitory storages) 166 that may store one or more applications 168, a data storage 170, a camera unit 172, and the input device(s) 150 and display device(s) 152. The processor 160 may include one or more CPUs, one or more graphics processing units (GPUs), and/or other processing units suitable to execute software instructions stored in the application storage 166, for example. The client device 104 may include one or more user-accessible client user interfaces (UIs), which may include software controlled by the server device 102 and delivered via the network 106.

The application storage 166 may include one or more persistent memories (e.g., hard drive and/or solid state memory), and may store one or more applications (web application, mobile application, etc.) 168 including, for example, one or more dynamic UX applications offered by an organization as described herein (e.g., applications for applying for a credit card, auto insurance, or for other products and/or services). The application 168 may load components (e.g., user interface components) and other application data received from the server device 102 into the RAM 162, and/or store such components/data at the data storage 170.

Generally, applications 168 at the client device 104 may, upon execution, cause the client device 104 to accept client device user input and/or provide output via one or more interfaces supported by the input device 150 and/or the display device 152. The input device 150 may include, for example, a microphone, a touch screen, a keyboard, a mouse, or another suitable input device. The display device 152 may include, for example, a screen display, a speaker, or some other suitable unit for providing output to a user of the client device 104. In some embodiments, the input device 150 and display device 152 may be integrated (e.g., as a touchscreen display capable of accepting input and producing output). Effectively, the input device 150 and display device 152 may collectively enable a user to interact with one or more user interfaces components provided via a dynamic UX application executing on the client device 104.+

The client device 104 may transmit requests and/or other information to the server device 102 via the communication module 164 over the network 106. Requests may include data and/or metadata indications (e.g., a universally unique identifier (UUID) or other identifier) triggered by user interaction with the input device 150. Further the client device 104 may decorate requests with an indication of the type of the request. For example, the client device 104 may indicate a request as a request for a business resource, information regarding a user, information regarding execution of an application or application component, etc.). Communication between the client device 104 and the server device 102 may be implemented via one or more suitable communication protocols (e.g., HTTP, TCP, UDP, a cellular communication protocol, etc.) over the network 106.

It should be especially noted that, while one client device 104 is depicted, more than one, or many client devices 104 may be included in the environment 104. Multiple client devices may, for example, correspond to multiple users of a dynamic UX application, wherein the server device 102 may simultaneously manage execution and delivery of the dynamic UX application to the multiple users. Additionally or alternatively, one particular user may correspond to multiple client devices 104, and the server device 102 may manage execution and delivery of the dynamic UX application across multiple devices 104 of the user. A user may, for example, complete some steps of an active workflow via a first device, and other steps of the workflow via a second device via components particular to the first and second devices (e.g., a web form on a laptop computer and a voice call to a telephone). Because state information associated with the active workflow is managed at the server device 102, steps may be easily delivered across multiple client devices 104 corresponding to a user.

Example Embodiments of Steps and Components

FIGS. 2, 3A-3C, and 4 depict example interfaces and environments illustrative of techniques by which steps, components, and workflows (or "paths") may be generated, delivered, and modified to provide dynamic UX applications that may be individualized to provide the most effective user experience for users of one or more applications offered by an organization. These example interfaces and environments will be discussed with reference to the greater computing environment 100 depicted in FIG. 1.

Figure 2:
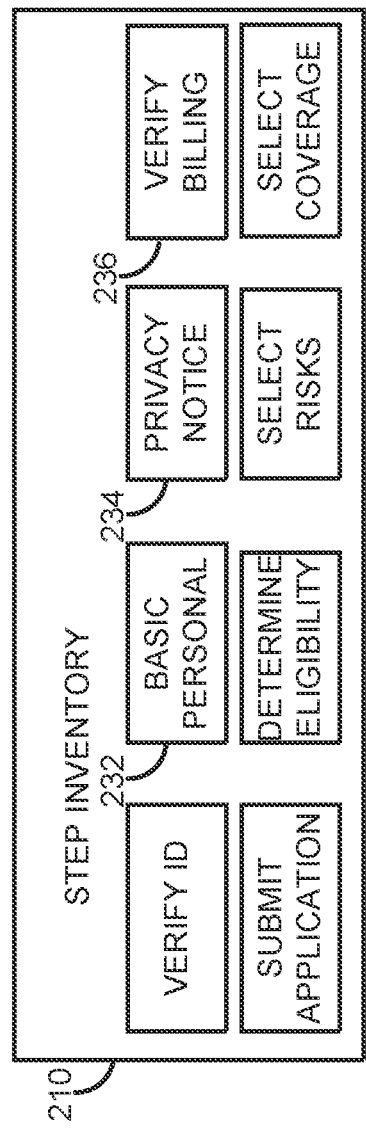
FIG. 2 depicts an example step inventory that may store a plurality of steps available for reuse across workflows, in accordance with some embodiments.

FIG. 2 depicts an example "step inventory" 210 that may be stored at the server device 102 of FIG. 1, or more particularly, at the workflow module 126 and/or step module 130, in accordance with the techniques described herein.

The step inventory 210 may include a multiplicity of steps available for construction of workflows associated with dynamic user experience (UX) applications. Generally, each step may correspond to a request/response loop between the server device 102 and the client device 104—in other words, a step may include a request for information, verification, acknowledgement, etc. from a client device user (i.e., application user), and a response from the user. For example, "Basic Personal" step 232 may request general personal information, such as home address, date of birth, etc., of the user. The "Privacy Notice" step 234 may display a privacy notice to a user, and request the user's acknowledgement of the notice. The "Verify Billing" step 236 may display billing/payment information associated with the user, and request that the user verify the accuracy of the information.

Given the depicted step inventory 210, it should be understood that many of the steps may be common to multiple business processes in an organization. For example, the "Basic Personal" step 232 may be reusable between an application for obtaining a credit card and an application for acquiring auto insurance, because business processes associated with both applications may require gathering the same basic personal information regarding the applicant. Accordingly, the step inventory 210 allows application developers to easily reuse the steps to construct a variety of applications within an organization.

Figures 3A, 3B:
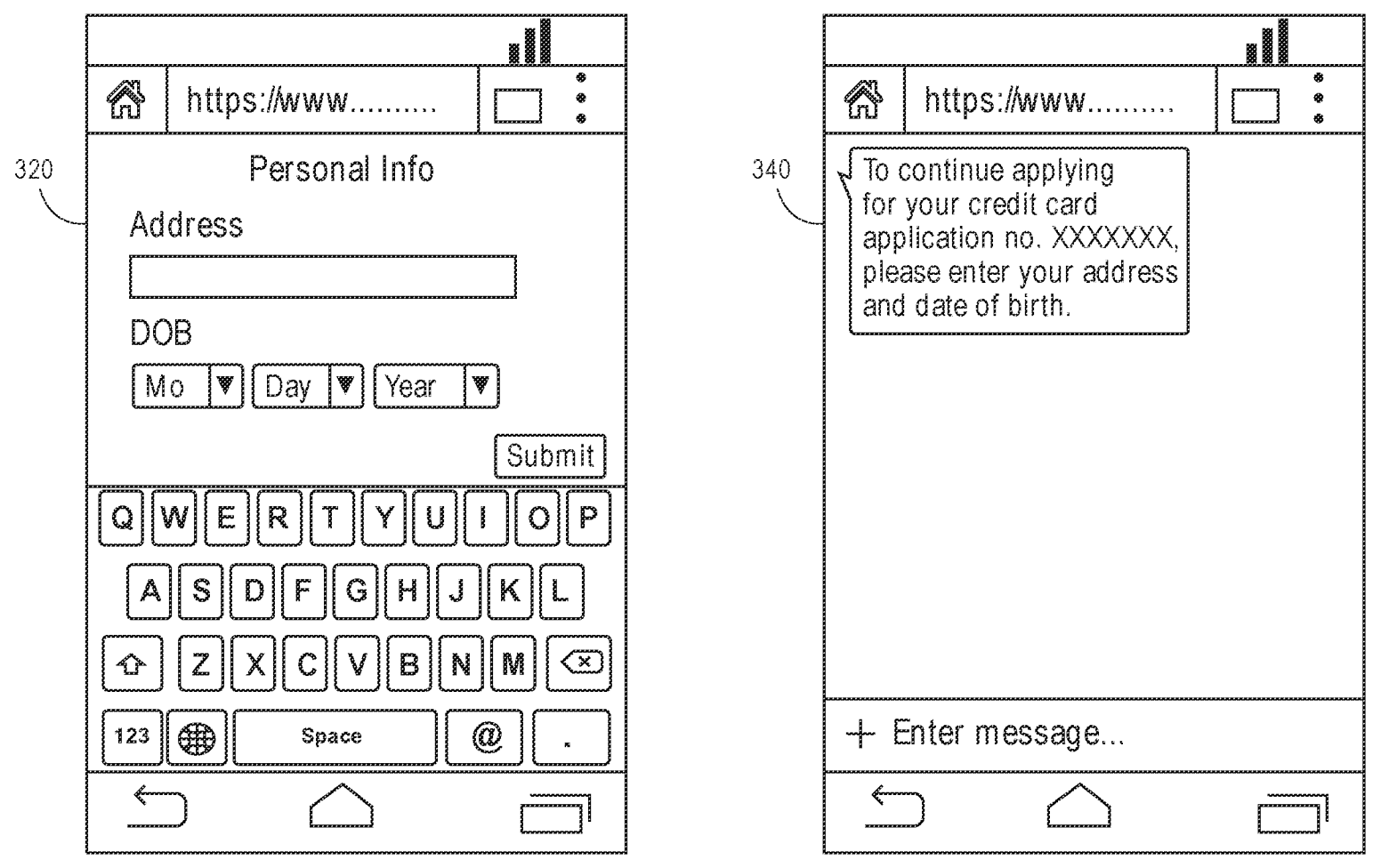
Figure 3C:
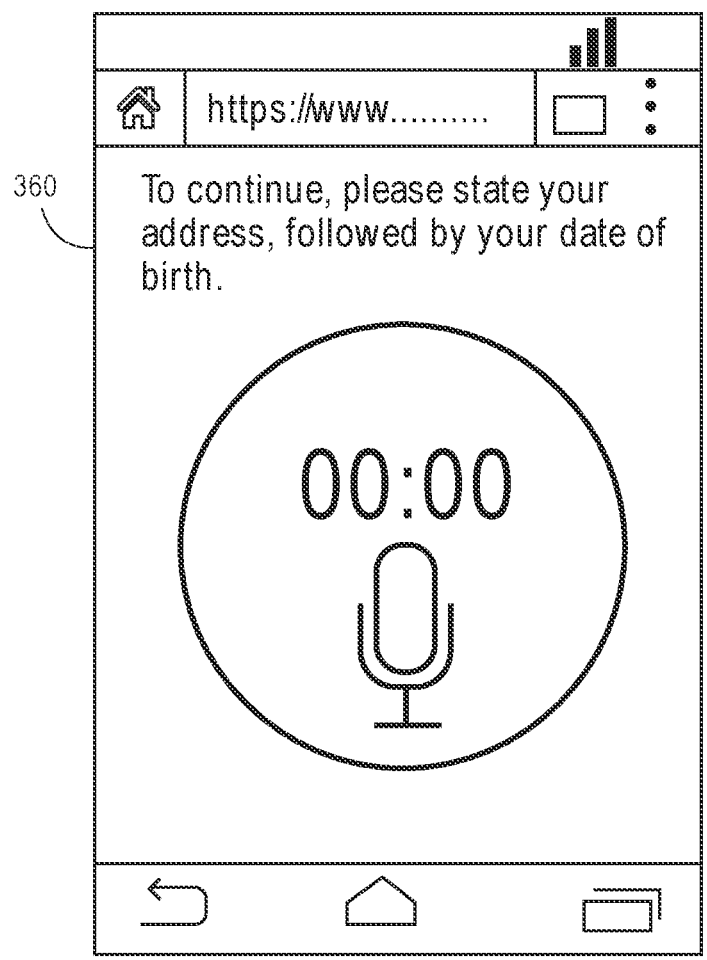

Each step may be associated with one or more components that may be equally and independently deliverable by the server device 102 to the client device 104 to complete the respective step. To that end, FIGS. 3A-3C depict example user interface components that may be associated with the "Basic Personal" step 232. Components associated with a step may be stored, for example, within the step inventory 210 under their respective steps, and/or elsewhere in the server device 102 with a pointer to their respective steps.

FIG. 3A depicts a "web form" user interface component that may be delivered to a client device 104, and via which the user may complete the "Basic Personal" step 232. The web form may request that the user enter their home address (e.g., via a keyboard) and date of birth (e.g., via a keyboard, or via touch interaction and drop-down menus provided in "month," "day," and "year" fields). Delivering the web form component may, for example, cause an application 168 on the client device 168 to automatically navigate a web browser to web page displaying the web form, or alternatively, may display a URL within the application, wherein the user may touch or click the URL to navigate to the web form. Upon selecting "submit" the client device 104 may transmit the provided information to the server device 102, which may store the provided information, for example, under canonical data types "homeAddress" and "birthDate." Consequently, the workflow manager 126 at the server device 102 may advance the workflow.

FIG. 3B depicts an "SMS" user interface component 340 that may be delivered to the client device 104, and via which the user may complete the "Basic Personal" step 232. Delivery of the SMS component may include sending, via the server device 102, an SMS text message to a smartphone device of the user requesting the user's address and date of birth. The user may respond via one or more SMS messages, which may be transmitted back to the server device 102 to complete the same "Basic Personal" step 232. It should be noted that it may be necessary for the server device 102 (e.g., at the protocol handler 136) to parse the one or more messages provided by the user to convert the provided text to the required canonical types for storage. Parsing the messages may include validating input (e.g., a valid street address should include a number, street, unit, etc.).

FIG. 3C depicts a "voice" user interface component 360 that may be delivered to the client device 104, and via which the user may complete the "Basic Personal" step 232. The voice component 360 may, in some embodiments, be presented via the application 168 as pictured, in the form of a text prompt and user control for recording a voice response via a microphone unit included at the client device 104. Alternatively, the voice component 360 may display the text prompt and subsequently initiate a phone call to a smartphone device of the user, over which the user may provide the requested information. In any case, as with the SMS response received via the SMS component 340, receiving a voice response via the voice component 360 may require parsing of the response (e.g., data validation) and conversion of the response to canonical data types for storage and advancement of the workflow.

Effectively, each of the components 320, 340, and 360 may be equally and independently deliverable via the server device 102 and executable by the client device 104 to complete the "Basic Personal" step 232. Via any of the three interfaces, the server device 102 requests information from the user, receives a response, processes to the response into common canonical data types, stores the received information accordingly, and communicates to the workflow manager to complete the step 232 and advance an active workflow. The variety of the components associated with a step may allow an experience manager 132 to tailor a step individually to potentially diverse users of the application, based upon user experience rules and/or learned information regarding workflows, steps, components, and application users. Furthermore, the organization of components and steps may enable application developers to easily add, test, and/or remove user interface components to improve the dynamic user experiences of application users.

Workflow Structure and Execution

Figure 4:
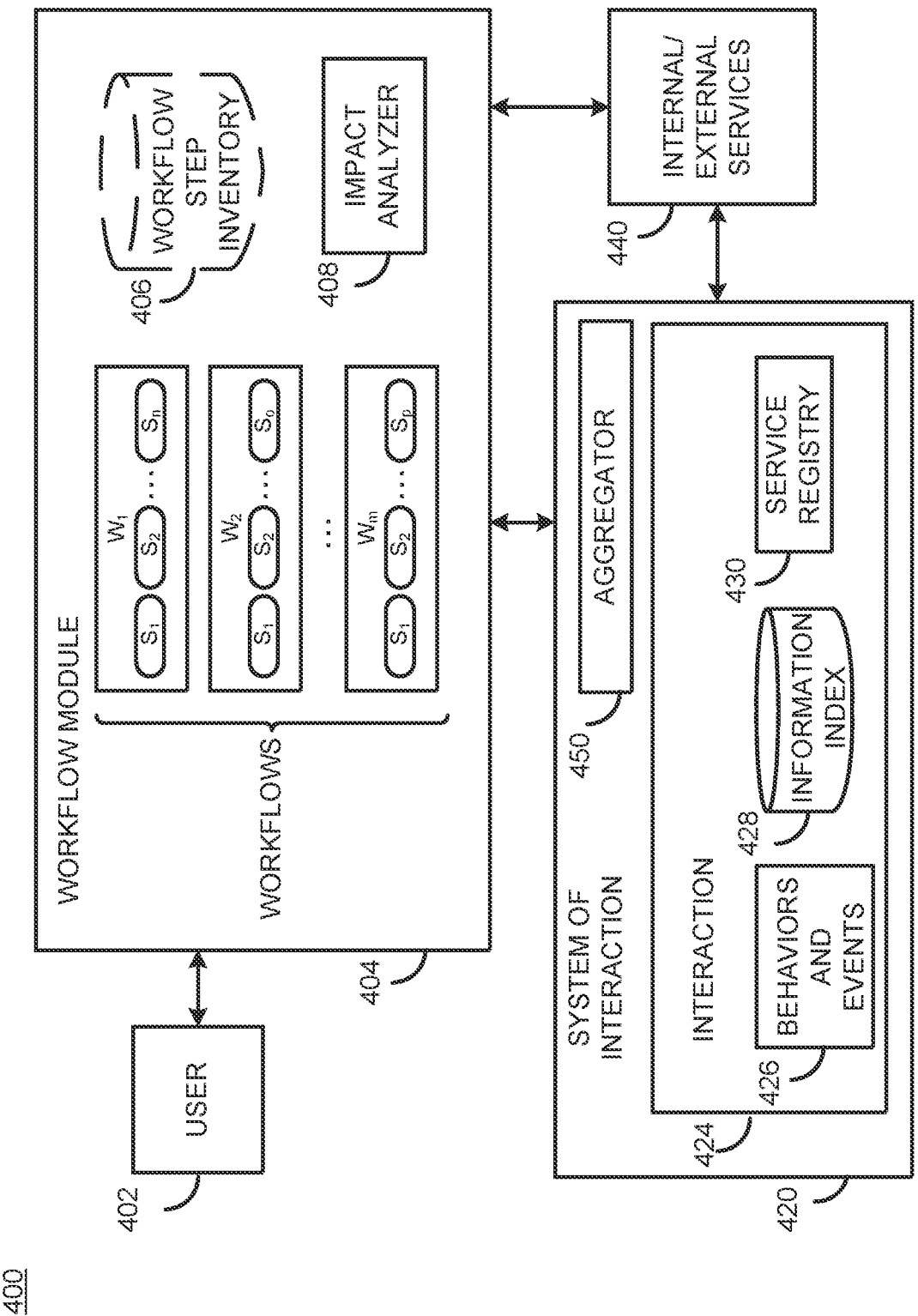
FIG. 4 depicts an example computing environment comprising a workflow manager, in accordance with some embodiments.

FIG. 4 depicts an example computing environment 400 for executing workflows and steps in a dynamic UX application, in accordance with some embodiments.

The environment 400 may include a user (i.e., one or more client devices corresponding to the user) 402 in communication with a workflow module 404, which may correspond or otherwise be included within the workflow module 126 depicted in FIG. 1. It should be understood that, while communication between the user 402 and the workflow module 404 is depicted simply via a bidirectional arrow, communications between the user 402 and workflow module 404 may include passing of information among the workflow module 404, the experience module 132, the protocol handler 136, and/or other server-side components as described herein.

The workflow manager 404 may a workflow step inventory 406, which may correspond to the step inventory 210 depicted in FIG. 2. The workflow module 404 may reference steps from the workflow step inventory 406 to construct and store workflows associated with applications. The stored workflows may include workflows $W_1$-$W_m$, wherein m is any integer, and which may respectively contain steps $S_1$-$S_n$, $S_1$-$S_o$, and $S_1$-$S_p$ wherein n, o, and p may be any integers. That is, the steps in workflows $W_1$-$W_m$ may respectively include any number of steps. The steps may be ordered, in some embodiments, or may otherwise be associated with dependencies. However, it should be noted that the number of steps per workflow may differ. Therefore, in the depicted example, the indices n, o, and p may differ, in addition to the identity of the steps composing each respective workflow. Further, no two steps at the same position within a workflow may necessarily be the same (e.g., $W_1S_1$ and $W_2S_1$ may differ). Workflows may, in some embodiments, be generated and/or modified by an administrative user via an administrative interface, as will be described herein. Additionally or alternatively, workflows may be generated and/or modified automatically based upon learned information collected via use of applications by users (e.g., information indicative of efficacy of a step, workflow, application, etc., with regard to one or more application users).

The workflow module 404 may include a workflow step catalog 406, as well as an impact analyzer 408, which may correspond to the step module 130, in some embodiments. The workflow step inventory 406 may be an electronic database which may or may not be integral to workflow module 404. For example, in some embodiments, the workflow step inventory 406 may be a remote database communicatively coupled to a device in which workflow module 404 is included, via a network. The impact analyzer 408 may determine what information a workflow currently has regarding a user, and what additional information may be required to complete the workflow (e.g., to complete one or more particular steps therein). The impact analyzer 408 may determine which additional information is required by accessing, for example, a system of interaction 420.

In an embodiment, the workflow module 404 may load a workflow by a name provided in a uniform resource identifier (URI). The workflow may include a list of step references. The workflow module 404 may hydrate the workflow by instantiating an instance of each step reference in the workflow. The workflow module 404 may load step classes from the workflow step inventory 406. Accordingly, workflows may receive any changes implemented to steps, and/or the rules, dependencies, or components associated therewith. As the workflow module 404 instantiates each step reference, the workflow module 404 may associate the instantiated class with the respective step reference in the workflow being hydrated. The hydrated workflow may then be passed to a runtime. Steps may be annotated with canonical resource and type information as they are instantiated.

Generally, the system of interaction 420 may store information associated with users and their interactions with dynamic UX applications. The system of interaction 420 may, for example, include a "behaviors and events" index 426 that may include records of interactions (e.g., completion or lack of completion of steps, time to complete steps, explicit user feedback, validity of information provided via a component, or other indicators of efficacy of applications, workflows, steps, and/or components with regard to users) observed with regard to a user of a client device 104 executing a dynamic UX application. Action records may be connected to users via session, cookie, user identifier, or other suitable identifying information. Accordingly, the behaviors and events index 426 may be communicatively coupled to the experience module 132 to guide determination of steps and components to deliver to users in an active workflow.

The system of interaction may additionally include an information index 428 that may provide user information in response to a query by the impact analyzer 408, for example. User information at the information index 428 may, for example, include unique user identifying information (name, address, contact information, other personal information, etc.) that may have been collected from the user during earlier execution of an active application, from another application, or from another source of information regarding the user. Effectively, the information index 428 stores persistent information that, otherwise, may have been required to be asked of a client redundantly during execution of separate workflows and applications.

The system of interaction 420 may further include a service registry 430, which may function to (i) survey the information index to determine what information the system of interaction 420 already has regarding a user, and (ii) determine what additional internal/external services 440 (e.g., API-based services including services within the organization and external, third-party services) the system of interaction 420 may call to find additional information regarding a user. The service registry 430 may identify usable services, for example, via an algorithm to select a service that a data aggregator 450 may call to acquire information. Such an algorithm may, in some embodiments, be configured to observe business-defined rules regarding the sharing of information. User circumstances, particular elements of user information may be restricted from being shared by a service. For example, a rule may exist that restricts a user's social security number (SSN) from being shared between a credit card application and an auto insurance application (or alternatively, may allow SSN sharing only upon affirmative consent by the user). Effectively, such a restriction may require that a user re-enter the SSN in each active workflow, even if other services within the organization or external services may have access to the SSN (e.g., via the user's previous interactions with applications, products, and/or services).

The aggregator 450 may collect user data from internal/external services 440 and combine the collected data with information from the information index 428 to acquire a complete view of what information the system of interaction 420 has regarding a user. The aggregator 450 may communicate this knowledge to the workflow module 404, which may, in some embodiments, cause modification of the workflow. For instance, the workflow module may determine that an active workflow step (e.g., step $S_2$ of workflow $W_1$) that normally requires two elements of personal information (e.g., address and date of birth, as depicted by the user interface components in FIGS. 3A-3C) from a user may instead only need to require one of those elements, and thus may cause modification of a step (e.g., pre-population of a field in the interface 320 of FIG. 3A, or removal of the field altogether). In some situations, the workflow module 404 may even determine that all information required by a step is already on record at the system of interaction 420, and thus may cause a step in a workflow to be passed entirely. Thus, the workflow module 404 may communicate with the system of interaction 420 to prevent redundant collection of information, where appropriate.

In some embodiments, the additional required information determined by impact analyzer 408 may be grouped by step. The impact analyzer 408 may cause the workflow module 404 to modify the ordering of steps within the workflow, or to move the current step pointer to a particular step in response to missing information, or in response to a question in a step being answered in a specific way, or in response to a user-initiated event. For example, the impact analyzer 408 may cause the workflow module 404 to redirect the user to a step that indicates that the workflow is unable to continue the steps because the step needs missing information from the user. Once the user provides the additional information that is required, by sending a response received by workflow manager 404, impact analyzer 408 may analyze what steps can be executed with the new information.

Example Environment for Implementing Dynamic UX Workflows

Figure 5:
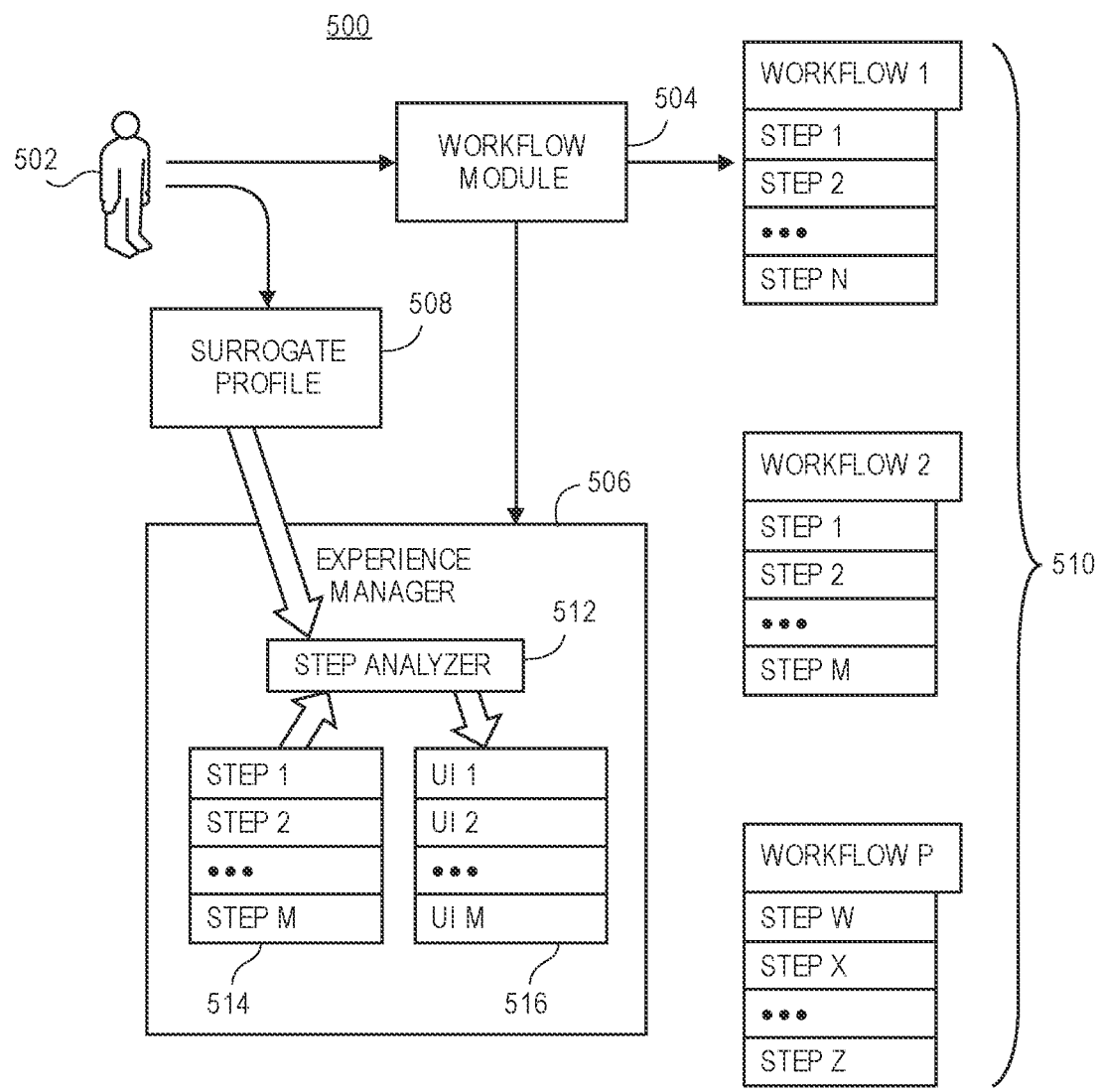
FIG. 5 depicts an example flow diagram modeling execution of a workflow.

FIG. 5 depicts an example flow diagram 500 for executing workflows within a dynamic user experience (UX) application, according to some embodiments. Generally, the elements of the flow diagram 500 may correspond to similar computing elements depicted in FIGS. 1-4. Communication between elements of the flow diagram 500 may be implemented, for example, via the network(s) 106 described with regard to FIG. 1.

The flow diagram 500 may include a user 502 utilizing one or more client devices (e.g., desktop, laptop, smartphone, combinations thereof, etc.) to use a dynamic UX application. Where actions herein are attributed to the user 502, it should be understood that those actions may be performed via one or more client devices of the user 502, for example, in response to human input provided by the user 502. The flow diagram may further include a workflow module 504 (e.g., corresponding to the workflow module 126 of FIG. 1), an experience manager 506 (which may correspond to the experience module 132), and user/surrogate profile 508. The workflow module 504 may correspond to a list of workflows 510 (e.g., Workflows 1, 2 . . . P, each of which may include one or more steps). It should be understood that any number of workflows may be possible, and each may include any number of steps (i.e., different numbers of steps). The experience manager 504 may include a step analyzer 512 (which may correspond to the step module 130), a list of steps 514 (which may correspond to an active workflow, e.g., Workflow 1 from list 510) executing on behalf of the user 502, and a list of components 516 generally corresponding to the list of steps 514 (e.g., corresponding in the manner depicted by FIGS. 2 and 3A-3C).

The user 502 may open or access a dynamic UX application (e.g., application 122 or 168), which may receive or retrieve a list of workflows (e.g., Workflows 1, 2 . . . P, each comprising one or more steps). In some embodiments, the user 502 may select a workflow corresponding to a task that the user would like to perform (e.g., "apply for a credit card"), and the selection may be transmitted as a request to the workflow module 504. Additionally or alternatively, the workflow module 504 may automatically select a particular workflow on behalf of the user 502, in response to the user 502 opening the application.

In any case, the workflow module 504 may identify, based upon the selected workflow, the collection of steps included therein, as well as current state information associated with the workflow, such as a step pointer to the currently active step in the workflow. For simplicity, this example assumes that the selected workflow is a new workflow, and thus the state information indicates that the first step in the workflow should be executed.

Communication between the workflow module 504 and the experience manager 506 may manage execution of the workflow, beginning with the first step. The workflow module 504 may transmit the list of steps 514 simultaneously, or sequentially upon execution, to the experience manager 506.

At the experience manager 506, the step analyzer 512 may analyze the first step to identify a user interface component (e.g., UI 1, UI 2 . . . U1 M) from the list of components 216 to deliver to the user 502 to perform the first step. It should be understood that, while a one-to-one correspondence between a step and a component may be described herein, other embodiments are possible. For example, multiple steps may be performed via a single component, or a step may correspond to multiple components.

The experience manager 506 may maintain a pointer to the active workflow step, beginning at the first step. To identify a particular component to deliver to the user 502 to execute the first step, the step analyzer 512 may analyze previously obtained research data indicative of efficacy of steps and components—in other words, data indicative of the likelihood of components to provide a satisfactory user experience to the user 502 such that the user 502 will more likely to successfully complete the workflow. The step analyzer 512 may determine, for example, that for a first "Basic Personal" step (see FIGS. 2 and 3A-3C), an SMS component for obtaining personal info has not been satisfactory and/or effective in causing other application users (or more particularly, users similar to the user 502) to advance in the active workflow (e.g., users do not complete the step, users are unable to provide a valid response, etc.). Consequently, the step analyzer 512 may determine that a web form component should instead be chosen for execution of the "Basic Personal" step.

Additionally or alternatively, the step analyzer 512 may determine the particular component based upon information included in the user/surrogate profile 508 (also referred to herein as "application delivery profile"). Information in the profile 508 may include, for example, demographic information about the user 502 (e.g., age, location, occupation, etc.), information about client devices owned by the user 502 (e.g., a tendency to use a smartphone more often than a desktop computer to run dynamic UX applications), as well as behaviors and/or events associated with the user's past use of dynamic UX applications (e.g., components used, steps/workflows completed, explicit or implicit feedback including survey data, facial analysis data, etc.). Furthermore, the profile 508 may include learned information for similar users, or all users of the active application and/or other applications (e.g., the advantage of web form over SMS as described above), as information general to a group of users or to all users may have at least some relevance to the user 502.

In any case, information obtained at the step analyzer 512 may be obtained, at least in part, via the workflow module 504 and/or the system of interaction 420 depicted in FIG. 4. The experience manager 506 may utilize information from the system of interaction 420, for example, to modify steps to prevent redundant requests of information from the user 502.

The experience manager 506 may identify a component and deliver that component to the user 502 using the techniques described in this detailed description (e.g., using the protocol handler 136 of FIG. 1). The experience manager 506 may receive feedback (e.g., the request information) from the user 502, and may forward the information to the workflow module 504. Additionally or alternatively, the user 502 may transmit information directly to the workflow module 504. Upon validation of the information and conversion of the received information into canonical format, the workflow module 504 may record the first step as complete (or, in some embodiments, partially complete) advance the workflow to a next step, and indicate to the experience manager 506 the next step to be performed. The experience manager 506 may update its pointer to reference a newly active step in the workflow. As each step executes, additional information may be learned about the user 502 and/or about other users of the application. Accordingly, behaviors and events associated with the user 502 at each step may be used to update the profile 508 and/or update other learned information. Hence, execution of steps and a workflow may be responsive to real-time behaviors, events, and knowledge gathered via the computing elements described herein. Request/response loops associated with steps may continue in the flow diagram 500 for each step, until completion of the active workflow.

Example Workflow Data Structure and Editing Interface

The techniques described in this detailed description thus enable tailoring of user experiences to individual users of a dynamic UX application, to provide a satisfactory experience that is likely to encourage users to complete steps and workflows. Furthermore, these techniques may enable generation, modification, and rearrangement of workflows, steps, and components used in dynamic UX application based on learned information, and generations and modifications may be quickly and easily ported across multiple applications that an organization may potentially offer to users.

Figure 6:
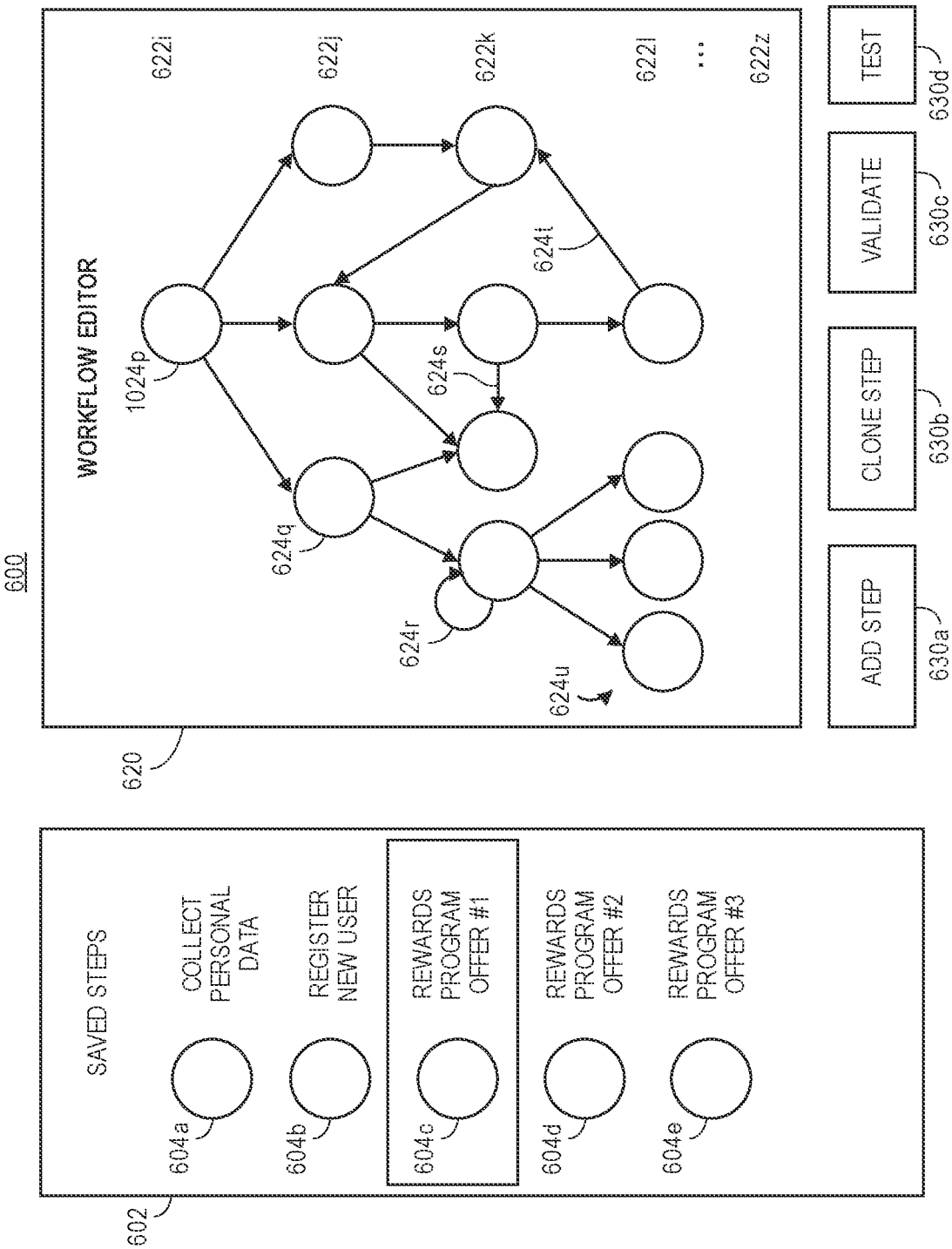
FIG. 6 depicts a modifiable, hierarchical organization of workflows and steps, in accordance with some embodiments.

To that end, FIG. 6 depicts an example administrative interface 600 that an administrative user, for example, may utilize to generate, modify, and/or rearrange elements of a step and/or workflow. The administrative interface 600 may be hosted, in some embodiments, at an application on the server device 102 depicted in FIG. 1 (e.g., within the workflow module 126). Generally, an administrative user may utilize the interface 600 in light of any of the learned information described herein regarding users and/or the efficacy of workflows, steps, and/or components with regard to users.

The interface 600 may include a list of steps 602 including steps 604a-604e. The list of steps 602 may, in some embodiments, correspond to some or all of the steps included in the step inventory 210 depicted in FIG. 2. Selecting a step (e.g., by mouse click, touch, etc.) may open enable the administrative user to modify the step, for example by modifying one or more parameters associated with the step, one or more canonical types associated with the respective one or more parameters, inherent dependencies between the step and another step, step logic for parsing data provided via a user (e.g., converting user input to canonical data type), and/or other data associated with the step. Additionally or alternatively, selecting the step may enable the administrative user to view, generate, or modify one or more user interface components associated with the step. Selection of a step may enable reconfiguration of the step within the same interface 620 and/or via another, separate interface.

Modification of a step (including modification of a component therein) may cause an update to the instance of the step in the step inventory to reflect the current configuration of the step. Accordingly, because workflows may reference the steps from the step inventory, modification of a step may cause propagation of the modifications to all workflows that include the step.

The interface 600 may include a workflow editor or "path editor" 620, which may enable a user to reconfigure a workflow associated with a dynamic UX application. In this embodiment, the depicted workflow is a hierarchical workflow comprising steps at hierarchical levels 622i, 622j, 622k, 622l . . . 622z. The number of hierarchical levels in a workflow may be any integer, including zero (i.e., a fully sequential workflow with no hierarchical division).

The administrative user may place (e.g., drag-and-drop) steps from the list of steps 602 into the workflow editor 620, and define structures and connections between the place steps. The administrative user may, for example, define that a step 624p in layer 622i is a "root step" that may be executed as the first step in the workflows.

Steps may "branch" to and/or from other steps in the path of execution. For example, step 624p may branch into any of three steps in the layer 622j (e.g., step 624q) depending on step logic, which may be inherent to the step (i.e., defined by default across all instances of the step) or specifically configured by the administrative user. Connections between steps are not limited to "downward" connection in the hierarchy. The steps may include a self-referential step 624r, a step 624s that points "horizontally" to another step in the same hierarchical layer, and/or a step 624t that points "upward" to a step in a higher hierarchical layer. Finally, the steps may include a "terminating" step 624u that may be a final step in a workflow.

The administrative user may utilize step controls such as an "add step" control 630a and a "clone (copy) step" 630b. Furthermore, the administrative user may further utilize the interface 600 as a testing environment via a "validate" control 630c and "test" control 630d, which may verify appropriate passing of data among steps, appropriate setting of step metadata, compliance with business rules, etc.

Similar to the updates in response to modifications of steps, modification of a workflow (including modification of a step therein) may cause propagation of the modifications to any dynamic UX applications that utilize the workflow. Thus, the techniques described herein may enable changes to be easily ported across multiple applications offered by an organization.

In some embodiments, the generation, modification, and/or rearrangement of workflows, steps, and/or components (collectively referred to herein as "reconfiguration of dynamic UX applications") depicted in the interface 600 and described herein may occur automatically (i.e., without configuration by a human user). A computer device may reconfigure dynamic UX applications, in some embodiments, based upon information learned via a machine learning algorithm, wherein processing elements may be trained to identify user experiences (i.e., workflows, steps, and/or components) to deliver to users, based upon known training data indicative of training workflows, steps, and/or components that provide satisfactory or unsatisfactory user experiences one or more "training users."

Method for Determining Efficacy of Dynamic UX Application

Figure 7:
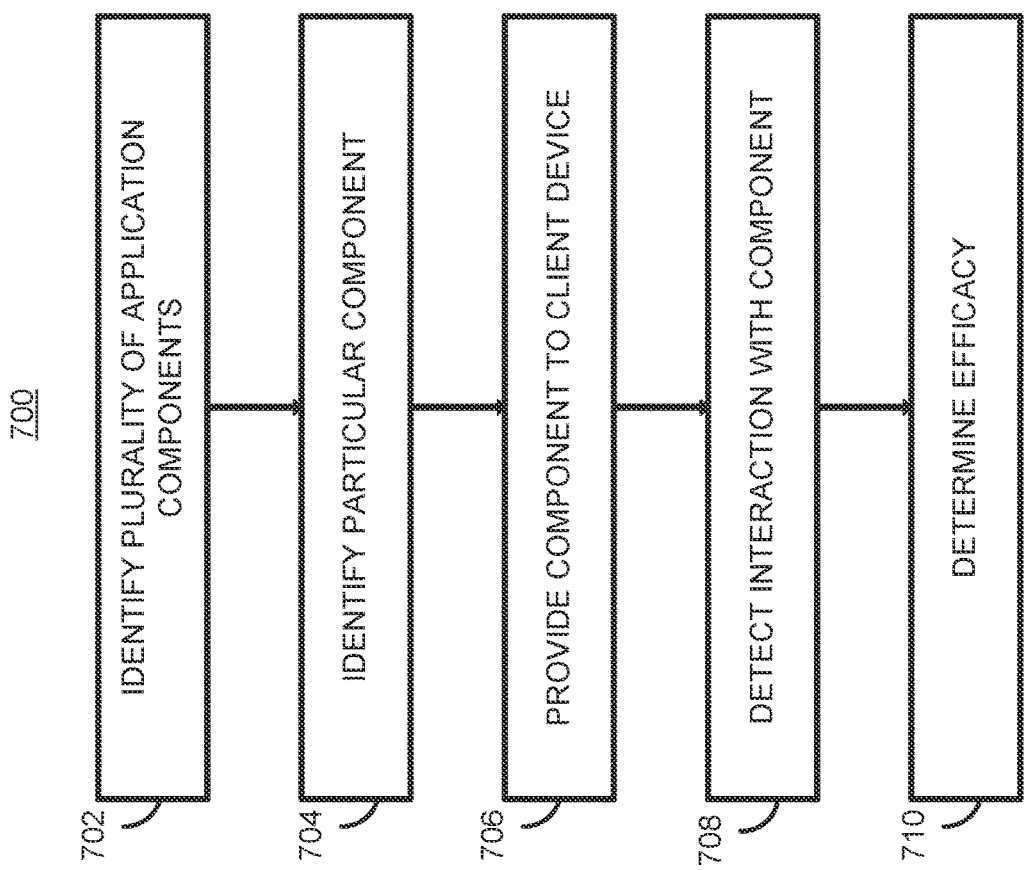
FIG. 7 depicts an example method of modifying a dynamic user experience application for delivery to a client device of a user, in accordance with some embodiments.

FIG. 7 depicts an example computer-implemented method 700 for determining an efficacy of a dynamic user experience application operating at a client device. The method 700 may be performed, for example, via the environment 100 using the principles and techniques described throughout this detailed description.

The method 700 may include identifying, via a remote computing system, a plurality of application components deliverable within the application, wherein each of the plurality of application components is associated with execution of a same step in an active execution path (or "workflow") of the application (702). Each of the plurality of components may be equally and independently executable to complete the step—in other words, only one component may need to be chosen. Generally, each component may include one or more interactive user interfaces (e.g., text message interfaces, web forms, etc.) via which the user/client may interact (e.g., type, touch, speak, etc.), to provided information needed by the step (e.g., step parameters that may include personal information, acknowledgement of a notice, information verification, etc.)

The method 700 may further include identifying, at the remote computing system, from the plurality of application components, a particular component to execute at the client device to perform the step, based upon an application delivery profile associated with the client device or a user of the client device, and/or based upon other considerations described in this detailed description (704). For example, identifying a particular component may, in some embodiments, include modifying a web form to include pre-populated information or fewer fields so as to reduce redundancy of tasks asked of the user.

The method 700 may further include providing, via the remote computing system, the particular component to the client device (706), using the techniques described herein.

The method 700 may further include detecting, via the remote computing system, one or more interactions with the provided component via the client device (708). Detecting an interaction may include receiving data transmitted (e.g., via SMS, voice, HTTP, and/or other protocols) to the remote computing system via the client device. Detecting an interaction, in some embodiments, may include detecting that the client device has partially or fully failed to interact with the component in an intended manner (e.g., has not provided one or more elements of information without a particular duration of time).

The method 700 may further include determining, at the remote computing system, an efficacy of the application, based at least in part upon the detected interaction (710). Determining efficacy of an application may include, for example, determining a time duration before response to a prompt (e.g., requested information) included in the provided component, determining whether the user responded to the prompt at all, whether the response was valid (e.g., valid address information including a street name, number, etc.), or other determinations discussed in this detailed description.

In some embodiments, the detected interaction may include image or audio data that may be usable to perform a facial analysis or voice analysis to determine the user's satisfaction with their user experience (e.g., satisfaction with the provided component). Accordingly, determining the efficacy may include receiving, at the remote computing system, imaging and/or audio data captured via the client device, and performing a facial analysis/voice analysis based upon the received imaging/audio data.

Determined efficacy of an application may be used to manually or automatically implement a variety of modifications to components, steps, paths, and/or applications, as is described throughout this detailed description. Such modifications may be based upon determined efficacy of the application with regard to one user, multiple users, or many users. Furthermore, modifications may be implemented based upon other external data, such as general survey data, research, etc. that may be of use in identifying components.

In any case, determined efficacy may further be utilized to modify application delivery profiles of one user, multiple users, or many users of dynamic UX applications, and to guide delivery of dynamic UX applications to users who have not yet begun using those applications (i.e., prospective users). Accordingly, the method 700 may further include modifying, based upon the determined efficacy, the application delivery profile associated with the user or the client device of the user, and/or an application delivery profile associated with one or more other users/clients.

In some embodiments, the method 700 may further include identifying, via the remote computing system, a second profile similar to the first application delivery profile, that second profile being associated with one or more other client devices of other users of the application (and/or another application, i.e., other clients/users in an organization's collective user base). The method 700 may further include modifying the second profile based upon the determined efficacy, thus propagating learned information to improve user experiences of another similar user.

The techniques described in this detailed description may enable easy and flexible testing procedures for workflows, steps, and components. For example, for a particular step, a first user or set of users may be provided a first component, and a second user or set of users may be provided a second component. Based upon detected interactions and efficacy, a person and/or an algorithm may determine, for example, that the second component is more effective in causing users to complete the execution path. Accordingly, the second component may be weighted to be used more than the first component in future application execution. Alternatively, it may be determined that the first and second components are each effective in serving their respective sets of users, and thus, delivery of components to future users may be guided by a determination of whether the user corresponds more strongly to the first or second set of users.

The method 700 may include additional, fewer, or alternate actions, including those described herein.

Additional Considerations

With the foregoing, any users (e.g., insurance customers) whose data is being collected and/or utilized may first opt-in to a rewards program, an insurance discount program, or another type of program. After the user provides their affirmative consent, data may be collected from the user's device (e.g., mobile device or other smart devices). Of course, local storage and use of a disposable UI at a user device (e.g., the client device 104 of FIG. 1) by an anonymous user may have the benefit of removing any concerns of privacy or anonymity, by removing anything except the minimum user interface elements needed to render steps and workflows, without storing data permanently on the client device 104. In such instances, there may be no need for affirmative consent.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules include a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for generating dynamic user experience applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method comprising:
   identifying, at a computing system and based at least in part on a request from an electronic device separate from the computing system, an application component executable to perform a step of a workflow;
   providing, by the computing system, the application component to the electronic device;
   detecting, at the computing system, an interaction with the application component by the electronic device, wherein the interaction includes a request for information;
   receiving, by the computing system, from the electronic device, and via the application component, data provided in response to the request for information;
   determining, by the computing system and based on the data satisfying the request for information, that the data is valid;
   determining, at the computing system and based at least in part on determining that the data is valid, an efficacy of the application component, wherein the efficacy is indicative of an amount of time required to complete the step; and
   modifying, by the computing system and based on the efficacy, the workflow, wherein the modification causes a reduction in the amount of time required to complete the step.

2. The computer-implemented method of claim 1, further comprising:
   modifying, by the computing system and based on the efficacy, a profile associated with at least one of the electronic device or a user of the electronic device,
   wherein modifying the workflow comprises generating a modified workflow.

3. The computer-implemented method of claim 2, further comprising:
   providing, by the computing system, the modified workflow to an additional electronic device, different from the electronic device, associated with the profile.

4. The computer-implemented method of claim 2, wherein the electronic device is a first electronic device and the profile is a first profile, the method further comprising:
   providing, by the computing system, the modified workflow to a second electronic device associated with a second profile,
   wherein a characteristic of the first profile matches a corresponding characteristic of the second profile.

5. The computer-implemented method of claim 1, wherein modifying the workflow comprises at least one of:
   generating a new step,
   removing the step,
   modifying of an order of steps in the workflow, or
   modifying a dependency between at least two steps in the workflow.

6. The computer-implemented method of claim 1, wherein the workflow is a first workflow and modifying the workflow comprises modifying the application component, the method further comprising:
   identifying, by the computing system, a second workflow including the application component; and
   modifying, by the computing system and based on the efficacy, the second workflow.

7. The computer-implemented method of claim 1, wherein the step is associated with a plurality of user interface components, and the application component is identified based at least in part on a characteristic associated with at least one of the electronic device or a user of the electronic device.

8. The computer-implemented method of claim 1, further comprising:
   modifying, by the computing system and based on the efficacy, a delivery pattern associated with a user of the electronic device,
   wherein the delivery pattern is indicative of a type of the electronic device.

9. The computer-implemented method of claim 1, wherein the step is a first step and the efficacy is a first efficacy, the method further comprising:
- determining, by the computing system, a second efficacy associated with a second step of the workflow; and
- determining, by the computing system and based at least in part on the first efficacy and the second efficacy, an overall efficacy of the workflow.

10. The method of claim 1, wherein the information is required to complete the step, and determining that the data is valid comprises determining that the data includes the information.

11. A computing system comprising:
a processor; and
a non-transitory program memory operably connected to the processor and storing executable instructions that, when executed by the processor, cause the processor to perform operations comprising:
- identifying, based at least in part on a request from an electronic device separate from the computing system, a component from a plurality of application components executable to perform a step of a workflow;
- providing the component to the electronic device;
- detecting an interaction with the component via the electronic device,
  - wherein the component includes a prompt requesting information;
- receiving, from the electronic device, and via the component, data provided in response to the prompt;
- determining, based on the data satisfying the requested information, that the data is valid;
- determining based at least in part on determining that the data is valid, an efficacy of the component, wherein the efficacy is indicative of an amount of time required to complete the step; and
- modifying based on the efficacy, the workflow, wherein the modification causes a reduction in the amount of time required to complete the step.

12. The computing system of claim 11, the operations further comprising:
- modifying, based at least in part on the efficacy, a first profile associated with at least one of the electronic device or a user of the electronic device; and
- modifying, based at least in part on the efficacy, a second profile associated with an additional user,
  - wherein a characteristic of the first profile matches a corresponding characteristic of the second profile.

13. The computing system of claim 12, wherein the component is identified based on the first profile.

14. The computing system of claim 11, wherein determining the efficacy is further based on:
- a time to respond to the prompt, or
- a lack of response to the prompt.

15. The computing system of claim 11, wherein modifying the workflow comprises at least one of:
- generating a new step,
- removing the step,
- modifying of an order of steps in the workflow, or
- modifying a dependency between at least two steps in the workflow.

16. The computing system of claim 11, wherein modifying the workflow is further based at least in part on an output of a machine learning algorithm trained using training data including prior interactions with components provided to perform the step of the workflow.

17. The computing system of claim 11, wherein the workflow is a first workflow and modifying the workflow comprises modifying the application component, the operations further comprising:
- identifying, by the computing system, a second workflow including the component; and
- modifying, by the computing system and based on the efficacy, the second workflow.

18. A system, comprising:
a means for electronic communication via a communication network;
a means for storing executable instructions;
a means for displaying a user experience (UX) component; and
a means for executing the executable instructions, the means for executing being configured to:
- identify, based at least in part on a request received by the means for electronic communication, a UX component executable to perform a step of a workflow;
- provide the UX component to the means for displaying;
- detect an interaction with the UX component,
  - wherein the interaction includes a request for information;
- receive, via the UX component, data provided in response to the request for information;
- determine, based on the data satisfying the request for information, that the data is valid;
- determine, based at least in part on determining that the data is valid, an efficacy of the UX component, wherein the efficacy is indicative of an amount of time required to complete the step;
- determine, based on the efficacy, a modified workflow, wherein the modification causes a reduction in the amount of time required to complete the step; and
- provide the modified workflow to the means for displaying.

19. The system of claim 18, further comprising a means for capturing audiovisual input, the means for executing being further configured to:
- receive at least one of imaging data or audio data captured via the means for capturing; and
- perform at least one of a facial analysis based on the imaging data, or a voice analysis based on the audio data,
  - wherein the efficacy is further based on the facial analysis or the voice analysis.

20. The system of claim 18, wherein the UX component includes a prompt for entering the data, and the efficacy is further based at least in part on a time to respond to the prompt.

* * * * *